United States Patent
Volkov et al.

(10) Patent No.: US 11,670,760 B2
(45) Date of Patent: Jun. 6, 2023

(54) PROCESS FOR MAKING LITHIATED TRANSITION METAL OXIDES

(71) Applicant: BASF SE, Ludwigshafen (DE)

(72) Inventors: Aleksei Volkov, Ludwigshafen (DE); Martin Schulz-Dobrick, Ludwigshafen (DE); Simon Schroedle, Ludwigshafen (DE); Jordan Lampert, Cleveland, OH (US)

(*) Notice: Subject to any disclaimer, the term of this patent is extended or adjusted under 35 U.S.C. 154(b) by 261 days.

(21) Appl. No.: 16/808,650

(22) Filed: Mar. 4, 2020

(65) Prior Publication Data

US 2020/0203719 A1    Jun. 25, 2020

Related U.S. Application Data

(62) Division of application No. 15/528,786, filed as application No. PCT/EP2015/076941 on Nov. 18, 2015, now abandoned.

(30) Foreign Application Priority Data

Nov. 28, 2014 (EP) ..................................... 14195471

(51) Int. Cl.
- *H01M 4/36* (2006.01)
- *H01M 4/505* (2010.01)
- *H01M 10/0525* (2010.01)
- *H01M 4/525* (2010.01)
- *C01G 53/00* (2006.01)
- *H01M 4/58* (2010.01)
- *H01M 4/62* (2006.01)
- *H01M 4/02* (2006.01)

(52) U.S. Cl.
CPC ............ *H01M 4/364* (2013.01); *C01G 53/50* (2013.01); *H01M 4/505* (2013.01); *H01M 4/525* (2013.01); *H01M 4/5825* (2013.01); *H01M 4/623* (2013.01); *H01M 4/625* (2013.01); *H01M 10/0525* (2013.01); *C01P 2004/50* (2013.01); *C01P 2004/51* (2013.01); *C01P 2004/61* (2013.01); *C01P 2004/62* (2013.01); *C01P 2006/11* (2013.01); *C01P 2006/12* (2013.01); *C01P 2006/14* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2008/0254368 A1* | 10/2008 | Ooyama | H01M 10/0587 429/223 |
| 2010/0136412 A1 | 6/2010 | Watanabe | |
| 2010/0327221 A1* | 12/2010 | Koga | C01G 45/02 427/217 |
| 2011/0076564 A1* | 3/2011 | Yu | H01M 4/1391 429/231.1 |
| 2011/0223482 A1 | 9/2011 | Fujii et al. | |
| 2012/0085968 A1 | 4/2012 | Kawakami et al. | |
| 2013/0119325 A1 | 5/2013 | Chang et al. | |
| 2014/0346393 A1 | 11/2014 | Park et al. | |
| 2015/0162612 A1 | 6/2015 | Kawakami et al. | |
| 2015/0200394 A1 | 7/2015 | Sakai et al. | |
| 2016/0064729 A1 | 3/2016 | Shindo | |

FOREIGN PATENT DOCUMENTS

| | | |
|---|---|---|
| CN | 102496710 A | 6/2012 |
| EP | 2 357 693 A1 | 8/2011 |
| EP | 2 375 477 A2 | 10/2011 |
| JP | 2009137795 * | 6/2009 |
| WO | 2012/038270 A2 | 3/2012 |

OTHER PUBLICATIONS

International Search Report dated May 23, 2016 in PCT/EP2015/076941 filed Nov. 18, 2015.

Gab Song, Han et al., "Enhanced electrochemical oroperties of Li(Ni$_{0.4}$Co$_{0.3}$Mn$_{0.3}$)O$_2$ cathode by surface modification usina Li$_3$PO$_4$-based materials," Journal of Power Sources, vol. 196, No. 16, Sep. 2010, XP028226114, pp. 6847-6855.

(Continued)

*Primary Examiner* — Tanisha Diggs
(74) *Attorney, Agent, or Firm* — Armstrong Teasdale LLP

(57) ABSTRACT

The present invention is directed towards a process for making a lithiated transition metal oxide, said process comprising the following steps:

(a) providing a precursor selected from mixed oxides, hydroxides, oxyhydroxides, and carbonates of nickel and at least one transition metal selected from manganese and cobalt, wherein at least 45 mole-% of the cations of the precursor are Ni cations, (b) mixing said precursor with at least one lithium salt selected from LiOH, Li$_2$O, Li$_2$CO$_3$, and LiNO$_3$, thereby obtaining a mixture, (c) adding at least one phosphorus compound of general formula (I)

$$X_yH_{3-y}PO_4 \qquad (I)$$

wherein
X is selected from NH$_4$ and Li,
y is 1 or 2,
to the mixture obtained in step (b),
wherein steps (b) and (c) may be performed consecutively or simultaneously, (d) treating the mixture so obtained at a temperature in the range of from 650 to 950° C.

10 Claims, No Drawings

(56) References Cited

Jo, Chang-Heum et al., "An effective method to reduce residual lithium compounds on Ni-rich Li[$Ni_{0.6}Co_{0.2}Mn_{0.2}$]$O_2$ active material using phosphoric acid derived $Li_3PO_4$ nanolayer," Nano Research, Nov. 2014, XP002739724, (total 19 pages).
International Preliminary Report on Patentability dated Oct. 4, 2016 in PCT/EP2015/076941.

* cited by examiner

PROCESS FOR MAKING LITHIATED TRANSITION METAL OXIDES

This application is a Divisional of U.S. application Ser. No. 15/528,786, filed May 23, 2017, which is a 371 of PCT/EP2015/076941, filed on Nov. 18, 2015, and claims priority to European Patent Application No. 14195471.9, filed on Nov. 28, 2014. The present invention is directed towards a process for making a lithiated transition metal oxide, said process comprising the following steps:

(a) providing a precursor selected from mixed oxides, mixed hydroxides, mixed oxyhydroxides, and mixed carbonates of nickel and at least one transition metal selected from manganese and cobalt, wherein at least 45 mole-% of the cations of the precursor are Ni cations, (b) mixing said precursor with at least one lithium salt selected from $LiOH_2$, $Li_2O$, $Li_2CO_3$, and $LiNO_3$, thereby obtaining a mixture, (c) adding at least one phosphorus compound of general formula (I)

$$X_yH_{3-y}PO_4 \qquad (I)$$

wherein
X is selected from $NH_4$ and Li,
y is 1 or 2,
to the mixture obtained in step (b),
wherein steps (b) and (c) may be performed consecutively or simultaneously, (d) treating the mixture so obtained at a temperature in the range of from 650 to 950° C.

Storing energy has long been a subject of growing interest. Electrochemical cells, for example secondary batteries or accumulators, can serve to store electrical energy. As of recently, lithium ion batteries have enjoyed particular interest. They are superior to the conventional batteries in several technical aspects. For instance, they can be used to produce voltages unobtainable with batteries based on aqueous electrolytes.

In lithium ion batteries, the materials om which the electrodes are made, and more particularly the material from which the cathode is made, play an important role.

In many cases, lithium-containing mixed transition metal oxides are used as the active material, especially lithium-containing nickel-cobalt-manganese oxides. In a usual process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$, $LiNO_3$ or—especially—$Li_2CO_3$—and calcined (fired) at high temperatures. Lithium salt(s) can be employed as hydrate(s) or in dehydrated form. The thermal treatment may be performed at temperatures in the range from 800 to 1000° C.

It is desirable in many cases to achieve high nickel contents of the mixed transition metal oxides because such materials have a high capacity and a high energy density. However, nickel-rich materials in many cases have reduced thermal stability. In addition, several lithiated transition metal oxides with a nickel content of 45 mol-% and higher, referring to the total transition metal content, often suffer from a residual carbonate content. Such residual carbonate is frequently made responsible for the deterioration of the capacity of lithium ion batteries after multiple cycle steps. Other such undesired compounds are lithium oxide and lithium hydroxide. Traces of lithium carbonate in lithiated transition metal oxides may stem from unreacted lithium carbonate used as common starting material for the introduction of lithium into the respective precursor. Although it has been suggested to replace lithium carbonate by lithium hydroxide or some other lithium compound other than lithium carbonate the favorable price and easy handling still drives many manufacturers to use it. In particular, the conversion of precursors containing 45 mole-% or more of Ni, relating to total transition metal content, with lithium salts may be slow, resulting in unreacted lithium salts. Such unreacted lithium salts may be converted to lithium carbonate during storage or handling under air. $Li_2CO_3$ may react with traces of any Lewis acid formed during charging or discharging of a battery. Upon such a reaction, $CO_2$ will be formed that may damage the battery during the operation. A residual carbonate content of 0.5% is therefore in most cases not accepted.

For making a cathode, many sources suggest to slurry a cathode active material, a binder and carbon. However, residual LiOH as well as $Li_2O$ may lead to gelation of such slurries.

In CN 102 496 710 A1, a method is disclosed to coat special lithiated transition metal oxides with a mixture from lithium phosphate and transition metal oxide such as $ZrO_2$ or with a mixture from lithium phosphate and $Al_2O_3$. The process, however, is tedious and requires a double calcination step.

It was therefore an objective of the present invention to provide a method for making an electrode material that has a good cycle stability and therefore provides an extended life of the battery. In addition, it was an objective of the present invention to provide an electrode material for lithium ion batteries with a good cycle stability and life time. In particular, it was an objective of the present invention to provide an electrode material for lithium ion batteries with a residual carbonate content of 0.3% by weight or less. In addition, it was an objective of the present invention to provide uses for electrode materials.

Accordingly, the process defined at the outset has been found, hereinafter also being referred to as process according to the present invention or as inventive process.

The inventive process is a process for making a lithiated transition metal oxide, said process comprising the following steps:

(a) providing a precursor selected from mixed oxides, mixed hydroxides, mixed oxyhydroxides, and mixed carbonates of nickel and at least one transition metal selected from manganese and cobalt, wherein at least 45 mole-% of the cations of the precursor are Ni cations—said step hereinafter also being referred to as step (a), (b) mixing said precursor with at least one lithium salt selected from LiOH, $Li_2O$, $Li_2CO_3$, and $LiNO_3$, thereby obtaining a mixture—said step hereinafter also being referred to as step (b), (c) mixing said mixture with at least one phosphorus compound of general formula (I)

$$X_yH_{3-y}PO_4 \qquad (I)$$

wherein
X is selected from $NH_4$ and
y is 1 or 2,
said step hereinafter also being referred to as step (c),
wherein steps (b) and (c) may be performed consecutively or simultaneously, (d) treating the mixture so obtained at a temperature in the range of from 650 to 950° C.—said step hereinafter also being referred to as step (d).

According to step (a), a precursor is provided. Said precursor is selected from mixed compounds of nickel and at least one transition metal selected from manganese and cobalt, preferably from mixed compounds of nickel, cobalt and manganese and, optionally, at least one further cation other than the forgoing. Said mixed compounds are selected from mixed oxides, mixed hydroxides, mixed oxyhydroxides, and mixed carbonates, with mixed hydroxides and mixed oxyhydroxides being preferred.

In one embodiment of the present invention, the precursor contains nickel cations, cobalt cations, and manganese cations and—optionally—cations of at least one more transition metal, of aluminum, of barium or of calcium.

At least 45 mole-% of the cations of the precursor are Ni cations.

Preferably, said precursor is a particulate material. That means that the precursor is provided in the form of a powder, and the powder being comprised of particles with an average diameter (D50) in the range from 0.1 to 35 μm, preferably 1 to 30 μm and more preferably 2 to 20 μm, measured, for example, by light scattering. Suitable equipment is commercially available, for example Malvern Mastersizer.

In a preferred embodiment of the present invention, the precursor has a metal composition according to the formula $Ni_aCo_bMn_cM_d$, wherein
a is in the range of from 0.45 to 0.9
b is in the range of from 0.05 to 0.3,
c is in the range of from 0.05 to 0.3,
d is in the range of from zero to 0.1,
with a+b+c+d=1,
and M being selected from one or more of Al, Ti, V, Zn, Ca, and Mo.

Preferably, the majority or all cations of nickel and cobalt or nickel and cobalt in said precursor are in the oxidation state of +2.

Precursors may be preferably prepared by co-precipitation of the respective hydroxides or carbonates from solutions of the respective transition metal salts such as the respective transition metal chlorides, transition metal nitrates, or transition metal sulfates, followed by drying under inert gas or under air at a temperature in the range of from 80 to 150° C.

Precursors may have a even transition metal composition measured over the diameter of each particle. In other embodiments, precursors may be so-called gradient materials, thus having different compositions of transition metal, measured over the diameter of each particle.

In one embodiment of the present invention, precursors are selected from those having a narrow particle diameter distribution. A narrow particle diameter distribution can be defined, for example, such that the ratio of the median diameters (D10)/(D50) is at least 0.5 and the ratio (D90)/(D50) is not more than 1.6.

Precursors may be provided in the form of agglomerates of primary particles. Corresponding primary particles may, for example, have a mean diameter in the range from 50 nm to 500 nm.

In one embodiment of the present invention, precursors have a BET surface area in the range from 0.1 to 1 m²/g, measured by nitrogen adsorption after outgassing of the sample at 200° C. for at least 30 minutes and otherwise on the basis of DIN ISO 9277.

In one embodiment of the present invention, precursors have a mean pore volume in the range from 0.2 to 0.5 ml/g, determined by Hg porosimetry for pore diameters in the range from 0.005 μm to 20 μm.

In one embodiment of the present invention, precursors have a mean pore volume in the range from 0.01 to 0.1 ml/g, determined by Hg porosimetry for pore diameters in the range from 0.005 μm to 0.1 μm.

In one embodiment of the present invention, precursors have a tamped density in the range from 1.8 kg/l up to 2.7 kg/l.

Preferably, precursors provided in step (a) of the inventive process are being provided in a pre-dried form, for example dried at a temperature in the range of from 80 to 120° C. In step (b), the precursor provided in step (a) is mixed with at least one lithium salt selected from LiOH, $Li_2O$, $Li_2CO_3$, and $LiNO_3$, each in anhydrous form or, if it exists, as the hydrate, preference being given to LiOH and particular preference to $Li_2CO_3$. A mixture is being obtained thereby.

The amounts of precursor and lithium salt are selected so as to obtain the desired stoichiometry of the cathode active material. Preferably, precursor and lithium compound are selected such that the molar ratio of lithium to the sum of all transition metals including any M—if applicable—is in the range from 1:1 to 1.1:1, preferably 1.03:1 to 1.06:1.

Step (b) can be performed in any conventional vessel or apparatus suitable for mixing particulate compounds.

In step (c), at least one phosphorus compound is added to the mixture obtained in step (b). Said phosphorus compound has the general formula (I)

$$X_yH_{3-y}PO_4 \qquad (I)$$

wherein
X is selected from $NH_4$ and Li,
y is 1 or 2.

Examples of compounds of general formula (I) are $LiH_2PO_4$, $Li_2HPO_4$, $Li(NH_4)HPO_4$, $(NH_4)_2HPO_4$, and $(NH_4)H_2PO_4$. Preferred examples are $LiH_2PO_4$ and $(NH_4)_2HPO_4$, and particularly preferred is $(NH_4)_2HPO_4$.

In one embodiment of the present invention, the weight ratio of phosphorus compound to precursor is in the range of from 1:200 to 1:50, preferably 1:100 to 1:50.

Steps (b) and (c) may be performed consecutively or simultaneously, preferably simultaneously.

Step (c) may be performed in the same apparatus in which step (b) is being performed. In one embodiment of the present invention, steps (b) and (c) are being performed simultaneously.

In a special embodiment of the present invention, compound (I) and lithium salt selected from LiOH, $Li_2O$, $Li_2CO_3$, and $LiNO_3$ are being pre-mixed and then added to the precursor, followed by mixing.

In step (d), the mixture obtained according to step (c) is being treated thermally. Thermal treatment can be performed at a temperature in the range of from 500 to 1000° C., preferably 750 to 950° C.

In one embodiment of the present invention, step (d) is performed in two or more stages, such stages being different in temperature. For example, in one embodiment of the inventive process, step (d) may comprise two stages, one being performed at a temperature in the range of from 400 to 700° C. and the second stage being performed at a temperature in the range of from 750 to 950° C. In another embodiment of the inventive process, step (d) may comprise three stages, one being performed at a temperature in the range of from 300 to 550° C., the second stage being performed at a temperature in the range of from 600 to 700° C. and the third in the range of from 750 to 950° C. A stage in the context of the inventive process is a sub-step that lasts at least 30 minutes during which the temperature is about constant in the range of ±10° C.

Step (d) may be performed in an atmosphere of oxygen, of oxygen-enriched air, of so-called synthetic air, or under air. An atmosphere of synthetic air or oxygen-enriched air is preferred. Man-made mixtures from nitrogen and oxygen are called synthetic air in the context of the present invention. The most preferred synthetic air is an 80/20 mixture by volume of nitrogen and oxygen. Synthetic air is preferred when lithium oxide or LiOH is selected as lithium salt. Air is preferred when lithium carbonate is selected as lithium salt.

In one embodiment of the present invention step (d) of the inventive process is being carried out at normal pressure. In another embodiment of the present invention the inventive process is being carried out under reduced pressure, for example 500 to 995 mbar. In an alternative embodiment, of the present invention the inventive process is being carried at a pressure in the range of from 1000 mbar to 2,700 mbar.

Suitable reaction vessels for step (d) of the inventive process are, for example, fluidized bed reactors, tunnel kilns, roller hearth kilns, rotary kilns, pendulum kilns, and rotary hearth kilns. Roller hearth kilns are preferred.

In one embodiment of the present invention, step (d) of the inventive process is being performed over a period of time of 1 hour to 24 hours, preferably 90 minutes to 8 hours.

In one embodiment of the present invention, temperature changes during step (d) are being performed slowly or in an expedited way. It is thus possible to choose a slow heating rate such as 1 to 3° C./min. In other embodiments, fast heating rates are chosen such as 5 to 25° C./min. Cooling can be performed at different rates as well. It is possible to simply remove the heated good from the reaction vessel and to thus apply an exponential cooling rate. It is possible to quench the heated good, for example with air at ambient temperature, or to store it in a room where a temperature above ambient temperature is provided.

By performing the inventive process, a cathode active material is obtained, hereinafter also being referred to as inventive cathode active material. The inventive cathode material has an excellent performance when used in electrodes, especially in cathodes for lithium ion batteries. It has a good cycle stability and therefore an excellent life time.

Another aspect of the present invention is a cathode active material having the general formula (II)

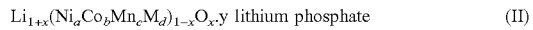

$$Li_{1+x}(Ni_aCo_bMn_cM_d)_{1-x}O_x \cdot y \text{ lithium phosphate} \quad (II)$$

wherein
- x is in the range of from zero to 0.1, preferably 0.005 to 0.05,
- a is in the range of from 0.45 to 0.9,
- b is in the range of from 0.05 to 0.3,
- c is in the range of from 0.05 to 0.3,
- d is in the range of from zero to 0.1,
- y is in the range of from 0.005 to 0.03 with a+b+c+d=1,
and M being selected from one or more of Al, Ti, V, Zn, Ca, and Mo,
said lithium phosphate being present in homogeneously dispersed form within the particles of $Li_{1+x}(Ni_aCo_bMn_cM_d)_{1-x}O_2$ or in form of separate particles.

In the context of the present invention, the term "lithium phosphate" encompasses lithium-containing phosphates such as, but not limited to $NiLiPO_4$, $MnLiPO_4$, $CoLiPO_4$, $Li_3PO_4$ and $Li_4P_2O_7$.

In a preferred embodiment of the present invention, inventive cathode active material has the formula (II) wherein lithium phosphate is selected from $Li_3PO_4$ and $Li_4PO_7$.

In one embodiment of the present invention inventive cathode active material contains in the range of from 0.01 to 0.5% by weight $Li_2CO_3$, determined as $Li_2CO_3$ and referring to said lithiated transition metal oxide.

In one embodiment of the present invention, the surface (BET) of inventive cathode active material is in the range of from 0.2 to 10 $m^2/g$, preferably from 0.3 to 1 $m^2/g$. The surface (BET) can be determined by nitrogen absorption, for example according to DIN 66131.

In one embodiment of the present invention, inventive cathode active material is in the form of agglomerated primary particles of inventive lithiated transition metal oxide. Such agglomerates are then being referred to as secondary particles of inventive lithiated transition metal oxide.

In one embodiment of the present invention, primary particles of inventive cathode active material have an average diameter in the range from 1 to 2000 nm, preferably from 10 to 1000 nm, particularly preferably from 50 to 500 nm. The average primary particle diameter can, for example, be determined by SEM or TEM.

In one embodiment of the present invention, the particle diameter (D50) of secondary particles of inventive cathode active material is in the range from 6 to 16 μm, especially 7 to 12 μm. The mean particle diameter (D50) in the context of the present invention refers to the median of the volume-based particle diameter, as can be determined, for example, by light scattering.

In inventive cathode active material, the lithium phosphate may be present in homogeneously dispersed form within the particles of $Li_{1+x}(Ni_aCo_bMn_cM_d)_{1-x}O_2$ or in form of separate particles. Without wishing to be bound by any theory it is assumed that lithium phosphate is in the form of glass particles separate from or attached to particles of $Li_{1+x}(Ni_aCo_bMn_cM_d)_{1-x}O_2$.

Inventive cathode active materials may in particular serve as electrode materials.

In one embodiment of the present invention, inventive cathode active materials have a residual carbonate content of zero to 0.3% by weight, preferably 0.01 to 0.3% by weight. The residual carbonate content can be determined by methods known per se, for example by release of $CO_2$ from an amount of sample in a glass cuvette and measurement of the amount of $CO_2$ via infrared adsorption in the glass cuvette. Alternative methods are titration methods, for example acid/base titrations.

A further aspect of the present invention refers to cathodes comprising at least one inventive cathode active material. They are particularly useful for lithium ion batteries, Lithium ion batteries comprising at least one cathode according to the present invention exhibit a very good discharge and cycling behavior. Preferably, also the cycle stability and the C-rate capacity behavior are improved. Cathodes comprising at least one cathode active material according to the present invention are hereinafter also referred to as inventive cathodes or cathodes according to the present invention.

In one embodiment of the present invention, inventive cathodes contain
- (A) at least one cathode active material, as described above,
- (B) carbon in an electrically conductive state, and
- (C) a binder.

Cathodes according to the present invention contain at least one cathode active material. Cathodes according to the present invention further contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

In one embodiment of the present invention, the ratio of carbon (B) to inventive cathode active material is in the range of 1 to 15% by weight, referring to component (b), preferably at least 2% by weight.

Electrodes according to the present invention can comprise further components. They can comprise a current collector, such as, but not limited to, an aluminum foil. They further comprise a binder (C).

Suitable binders (C) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 1 to 15% by weight of binder(s) (d), referring to the sum of component (a), component (b) and carbon (c).

A further aspect of the present invention is an electrochemical cell, containing
(a) at least one cathode comprising cathode active material (A), carbon (B), and binder (C),
(b) at least one anode, and
(c) at least one electrolyte.

Embodiments of cathode (a) have been described above in detail.

Anode (b) may contain at least one anode active material, such as carbon (graphite), $TiO_2$, lithium titanium oxide, silicon or tin. Anode (b) may additionally contain a current collector, for example a metal foil such as a copper foil.

Electrolyte (c) may comprise at least one non-aqueous solvent, at least one electrolyte salt and, optionally, additives.

Non-aqueous solvents for electrolyte (c) can be liquid or solid at room temperature and are preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

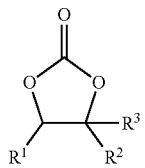

(III)

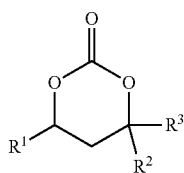

(IV)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

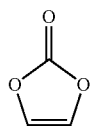

(V)

Solvent or solvents is/are preferably used in the water-free state, i.e. with a water content in the range from 1 ppm to 0.1% by weight, which can be determined, for example, by Karl-Fischer titration.

Electrolyte (c) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators (d) by means of which the electrodes are separated mechanically. Suitable separators (d) are polymer films, in particular porous polymer films, which are unreactive toward metallic lithium. Particularly suitable materials for separators (d) are polyolefins, in particular film-forming porous polyethylene and film-forming porous polypropylene.

Separators (d) composed of polyolefin, in particular polyethylene or polypropylene, can have a porosity in the range from 35 to 45%. Suitable pore diameters are, for example, in the range from 30 to 500 nm.

In another embodiment of the present invention, separators (D) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular with respect to the capacity loss.

Batteries according to the invention may comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by working examples.

EXAMPLES

Percentages are percent by weight unless expressly specified otherwise.

I. Manufacture of a Lithiated Transition Metal Oxide

I.1 Manufacture of Inventive Cathode Active Material (CAM.I)

A precursor was provided, composition $Ni_{0.6}Co_{0.2}Mn_{0.2}(OH)_2$. In a ball mill, $Ni_{0.6}Co_{0.2}Mn_{0.2}(OH)_2$ was mixed with $Li_2CO_3$ so that the Li/total transition metal molar ratio was 1.03/1. Then, 1% by weight of $LiH_2PO_4$ were added, the percentage referring to the sum of $Ni_{0.6}Co_{0.2}Mn_{0.2}(OH)_2$ and $Li_2CO_3$. The mixture so obtained was calcined in a box furnace under air with the following temperature program:

raise 3K/min to 350° C., maintain at 350° C. for 4 hours, raise 3K/min to 675° C., maintain at 675° C. for 4 hours, raise 3 K/min to 900° C., maintain at 900° C. for 6 hours. After step (d.1), the material so obtained was cooled to room temperature under air within a period of 12 hours, deagglomerated in a mortar and sifted through a sieve with 32 µm mesh size. Inventive cathode active material (CAM.1) was obtained.

I.2 Manufacture of Inventive Cathode Active Material (CAM.2)

A precursor was provided, $Ni_{0.6}Co_{0.2}Mn_{0.2}(OH)_2$. In a ball mill, $Ni_{0.6}Co_{0.2}Mn_{0.2}(OH)_2$ was mixed with $Li_2CO_3$ so that the Li/total transition metal molar ratio was 1.03/1. Then, 1% by weight of $(NH_4)_2HPO_4$ were added, the percentage referring to the sum of $Ni_{0.6}Co_{0.2}Mn_{0.2}(OH)_2$ and $Li_2CO_3$. The mixture so obtained was calcined in a box furnace under oxygen atmosphere with the following temperature program: raise 3K/min to 350° C., maintain at 350° C. for 4 hours, raise 3K/min to 675° C., maintain at 675° C. for 4 hours, raise 3 K/min to 900° C., maintain at 900° C. for 6 hours. After step (d.2), the material so obtained was cooled to room temperature under the oxygen atmosphere within a period of 12 hours, deagglomerated in a mortar and sifted through a sieve with 32 µm mesh size. Inventive cathode active material (CAM.2) was obtained.

I.3 Comparative Experiment: Manufacture of Comparative Cathode Active Material C-(CAM.3)

A precursor was provided, $Ni_{0.6}Co_{0.2}Mn_{0.2}(OH)_2$. In a ball mill, $Ni_{0.6}Co_{0.2}Mn_{0.2}(OH)_2$ was mixed with $Li_2CO_3$ so that the Li/total transition metal molar ratio was 1.03/1. No phosphate compound was added. The mixture so obtained was calcined in a box furnace under air with the following temperature program: raise 3K/min to 350° C., maintain at 350° C. for 4 hours, raise 3K/min to 675° C., maintain at 675° C. for 4 hours, raise 3 K/min to 900° C., maintain at 900° C. for 6 hours. After step (d.2), the material so obtained was cooled to room temperature under air within a period of 12 hours, deagglomerated in a mortar and sifted through a sieve with 32 µm mesh size. Comparative cathode active material C-(CAM.3) was obtained.

I.4 Comparative Experiment: Manufacture of Comparative Cathode Active Material C-(CAM.4)

A precursor was provided, $Ni_{0.6}Co_{0.2}Mn_{0.2}(OH)_2$. In a ball mill, $Ni_{0.6}Co_{0.2}Mn_{0.2}(OH)_2$ was mixed with $Li_2CO_3$ so that the Li/total transition metal molar ratio was 1.03/1. No phosphate compound was added. The mixture so obtained was calcined in a box furnace under oxygen atmosphere with the following temperature program: raise 3K/min to 350° C., maintain at 350° C. for 4 hours, raise 3K/min to 675° C., maintain at 675° C. for 4 hours, raise 3 K/min to 900° C., maintain at 900° C. for 6 hours. After step (d.2), the material so obtained was cooled to room temperature under the oxygen atmosphere within a period of 12 hours, deagglomerated in a mortar and sifted through a sieve with 32 µm mesh size. Comparative cathode active material C-(CAM.4) was obtained.

TABLE

| Material | $Li_2CO_3$ content of selected cathode active materials | | | |
|---|---|---|---|---|
|  | CAM.1 | CAM.2 | C-(CAM.3) | C-(CAM.4) |
| Content of $Li_2CO_3$ [% by weight] | 0.3 | ≤0.2 | 0.8 | 0.4 |

II. Manufacture of Inventive Cathodes and Inventive Electrochemical Cells

II.1 Production of Half Cells

To produce a cathode (a.1), the following ingredients were blended with one another:

88 g of CAM.1

6 g polyvinylidene difluoride, (c.1) ("PVdF"), commercially available as Kynar Flex® 2801 from Arkema Group, 3 g carbon black, (b.1), BET surface area of 62 m²/g, commercially available as "Super C 65L" from Timcal, 3 g graphite, (b.2), commercially available as KS6 from Timcal.

While stirring, a sufficient amount of N-methylpyrrolidone (NMP) was added and the mixture was stirred with an Ultraturrax until a stiff, lump-free paste had been obtained.

Cathodes were prepared as follows: On a 30 µm thick aluminum foil the paste was applied with a 120 µm doctor blade. The loaded foil was dried for 16 hours in a vacuum oven at 105° C. After cooling to room temperature in a hood, disc-shaped cathodes were punched out of the foil. The cathode discs were then weighed and introduced into an argon glove box where they are again vacuum-dried. Then, cells with the prepared discs were assembled.

Electrochemical testing was conducted in "TC1" cells. The electrolyte (c.1) used was a 1 M solution of $LiPF_6$ in ethyl methyl carbonate/ethylene carbonate (volume ratio 1:1).

Separator (d.1): glass fiber, Anode (b.1): lithium. Potential range of the cell: 3.0 V-4.3 V.

Inventive electrochemical cell (BAT.1) was obtained.

II.2 Manufacture of Cathodes and Electrochemical Cells According to the Invention, and of Comparative Cathodes and Electrochemical Cells The above experiment was repeated but inventive (CAM.1) was replaced by an equal amount of (CAM.2).

Inventive electrochemical cell (BAT.2) was obtained.

III. Testing of Batteries

Electrochemical cells according to the invention and comparative electrochemical cells are each subjected to the following cycling program: Potential range of the cell: 3.0 V-4.3 V, 0.1 C (first and second cycles), 2 C in the $3^{rd}$, $4^{th}$, $5^{th}$, $6^{th}$ and $7^{th}$ cycle, 0.1 C in the $8^{th}$ cycle, following by the cycles at 0.5 C, 1 C, 2 C, 3 C and 5 C. 1 C=150 mA/g. Temperature: 25° C.

Electrochemical cells according to the invention show an overall very good performance compared to comparative electrochemical cells.

The invention claimed is:

1. Process for making a lithiated transition metal oxide, said process comprising the following steps:
   (a) providing a precursor selected from mixed oxides, mixed hydroxides, mixed oxyhydroxides, and mixed carbonates of nickel and at least one transition metal selected from manganese and cobalt, wherein at least 45 mole-% of the cations of the precursor are Ni cations,
   (b) mixing said precursor with a lithium salt and the lithium salt is $Li_2CO_3$, thereby obtaining a mixture,
   (c) adding at least one phosphorus compound of general formula (I)

$$X_yH_{3-y}PO_4 \quad (I)$$

wherein:
   X is selected from $NH_4$ and Li,
   y is 1 or 2,
   to the mixture obtained in step (b),
   wherein steps (b) and (c) may be performed consecutively or simultaneously,
   (d) treating the mixture so obtained at a temperature in the range of from 650 to 950° C.; and
   wherein step (d) is performed in an atmosphere of oxygen or oxygen-enriched air.

2. The process according to claim 1 wherein the precursor contains nickel cations, cobalt cations, and manganese cations.

3. The process according to claim 1 wherein the precursor has a composition of the transition metals of $Ni_aCo_bMn_cM_d$, wherein
   a is in the range of from 0.45 to 0.9
   b is in the range of from 0.05 to 0.3,
   c is in the range of from 0.05 to 0.3,
   d is in the range of from zero to 0.1,
   with a+b+c+d=1,
   and M being selected from one or more of Al, Ti, V, Zn, Ca, and Mo.

4. The process according to claim 1 wherein in step (b) the molar ratio of lithium in lithium salt to transition metals in the precursor is in the range of from 1.11:1 to 1:1.03.

5. The process according to claim 1 wherein in step (c) the weight ratio of phosphorus compound and lithium salt of step (b) is in the range of from 1:100 to 1:50.

6. The process according to claim 1 wherein compound (I) is $(NH_4)_2HPO_4$.

7. The process of claim 1, wherein the precursor is a particulate material having an average particle diameter ranging from 0.1 μm to 35 μm.

8. The process of claim 7, wherein $(D_{10})/(D_{50})$ is at least 0.5 and $(D_{90})/(D_{50})$ is not more than 1.6.

9. The process of claim 1, wherein the precursor has a BET surface area ranging from 0.1 m²/g to 1 m²/g.

10. The process of claim 1, wherein the precursor has a mean pore ranging from 0.2 ml/g to 0.5 ml/g and pore diameter ranging from 0.005 μm to 0.1 μm.

* * * * *